US008611730B2

(12) United States Patent
Beattie, Jr. et al.

(10) Patent No.: US 8,611,730 B2
(45) Date of Patent: Dec. 17, 2013

(54) SYSTEM AND METHOD OF RECORDING MEDIA CONTENT

(75) Inventors: James Gordon Beattie, Jr., Bergenfield, NJ (US); Stephen Griesmer, Westfield, NJ (US); Stephen Triano, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 117 days.

(21) Appl. No.: 13/314,536

(22) Filed: Dec. 8, 2011

(65) Prior Publication Data
US 2013/0148939 A1 Jun. 13, 2013

(51) Int. Cl.
*H04N 5/76* (2006.01)
(52) U.S. Cl.
USPC ........... 386/292; 386/298; 386/296; 386/297; 386/294
(58) Field of Classification Search
USPC ..................... 386/292, 298, 296, 297, 294
See application file for complete search history.

(56) References Cited

U.S. PATENT DOCUMENTS

| | | | |
|---|---|---|---|
| 6,205,284 B1 * | 3/2001 | Kim ............................... 386/293 |
| 6,209,131 B1 * | 3/2001 | Kim et al. ....................... 725/50 |
| 7,899,305 B2 | 3/2011 | White |
| 8,024,762 B2 | 9/2011 | Britt |
| 8,352,629 B2 * | 1/2013 | Steadman et al. ............. 709/232 |
| 2004/0181805 A1 * | 9/2004 | Sullivan ........................... 725/39 |
| 2005/0100322 A1 * | 5/2005 | Kikuchi et al. .................. 386/95 |
| 2005/0289600 A1 * | 12/2005 | Kawahara et al. .............. 725/53 |
| 2008/0141322 A1 * | 6/2008 | Jang et al. ...................... 725/114 |
| 2008/0178225 A1 | 7/2008 | Jost |
| 2008/0273591 A1 * | 11/2008 | Brooks et al. ............ 375/240.01 |
| 2008/0306871 A1 | 12/2008 | Grannan |
| 2008/0306962 A1 | 12/2008 | Grannan et al. |
| 2009/0193482 A1 | 7/2009 | White et al. |
| 2010/0043022 A1 | 2/2010 | Kaftan |
| 2010/0179987 A1 | 7/2010 | Sebastian et al. |
| 2010/0242079 A1 | 9/2010 | Riedl et al. |
| 2011/0019534 A1 | 1/2011 | Ramakrishnan et al. |
| 2011/0107379 A1 | 5/2011 | Lajoie et al. |

* cited by examiner

Primary Examiner — Helen Shibru
(74) Attorney, Agent, or Firm — Toler Law Group, PC

(57) ABSTRACT

A method includes receiving a data stream at a media device and extracting data from the data stream. The data corresponds to received media content. The method further includes storing the extracted data at a memory as stored media content and determining whether the stored media content corresponds to expected media content. The method also includes, in response to determining that the stored media content does not correspond to the expected media content, sending a content request to a server. The content request identifies a segment of the expected media content that does not correspond to the stored media content.

13 Claims, 5 Drawing Sheets

SYSTEM AND METHOD OF RECORDING MEDIA CONTENT

FIELD OF THE DISCLOSURE

The present disclosure is generally related to recording media content.

BACKGROUND

Advances in technology have enabled access to television programs for both recording and immediate viewing. A user may watch a particular television program (e.g., a news program) on a particular channel while recording a different television program (e.g., a movie) on another channel. A user may also watch a television program on a particular channel while simultaneously recording the television program. A user may also schedule television program for future recording.

Problems can arise during recording of a television program. For example, the recorded television program may have unexpected segments, such as breaking news or weather alerts, that result in missing segments of the expected program. In another example, an event, such as power outage at a recording device (e.g., set-top box) or a recording device malfunction, may interrupt recording of the television program. In another example, a media content provider (i.e., a television program provider) may fail to provide the television program at a scheduled time and may instead provide a different program.

DETAILED DESCRIPTION

Figure 1:
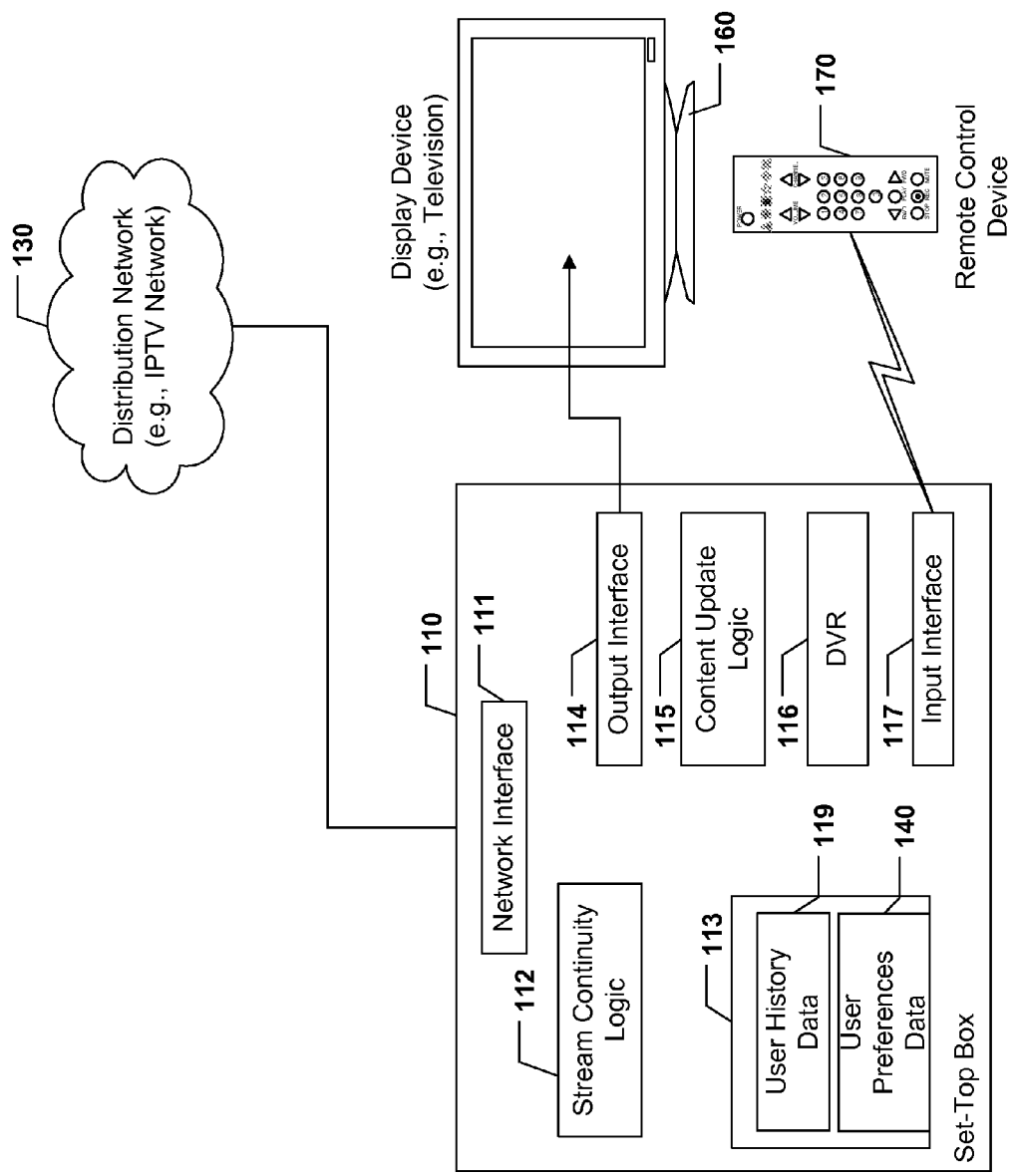
FIG. 1 is a diagram of a particular embodiment of a system to record media content.

Systems and methods of recording media content are disclosed. A data stream from a server may be received at a media device (e.g., a set-top box). The data stream may be an Internet protocol television (IPTV) stream, a cable television stream, a satellite television stream, an audio stream or another type of data stream. Media content may be extracted from the data stream and stored at a memory in the media device. For example, data corresponding to the media content may be stored at the media device based on a scheduled recording of the media content (e.g., a movie) from a particular television channel. While receiving the data stream or after recording of the media content is completed, the media device may evaluate the recorded media content (i.e., the stored data) to determine whether the media content corresponds to expected media content. For example, the media device may determine whether the recorded media content corresponds to a particular movie scheduled for recording. In another example, the media device may determine whether a quality of the recorded media content corresponds to an expected quality level. Upon determining that the recorded media content does not correspond to the expected media content, the media device may request that a server to send one or more segments of media content, where the one or more requested segments correspond to part of or all of the expected media content.

Additionally, systems and methods are disclosed for holding a user's place in a channel. For example, after a user has changed from left a particular channel (e.g., changed to another channel), and subsequently returns to the particular channel, the systems and methods disclosed may provide, to a display device, media content corresponding to the particular channel beginning where the user left the particular channel. To illustrate, a media device may detect a channel change request to change a channel from a first channel to a second channel. Upon detecting the channel change request, the media device may store user history data corresponding to the first channel that indicates a portion of the media content that had been received at the time the channel change request was detected. Upon a return to the first channel, the media device may provide the media content corresponding to the first channel beginning from the portion indicated in the user history data.

In a particular embodiment, a method includes receiving a data stream at a media device and extracting data from the data stream, where the data corresponds to received media content. The method further includes storing the extracted data at a memory as stored media content and determining whether the stored media content corresponds to expected media content. The method also includes, in response to determining that the stored media content does not correspond to the expected media content, sending a content request to a server. The content request identifies a segment of the expected media content that does not correspond to the stored media content.

In another particular embodiment, a method includes receiving, at a media device, a first data stream including first media content, where the first data stream corresponds to a first channel. The method further includes detecting at the media device a channel change request from the first channel to a second channel. The method includes storing user history data at the media device. The user history data indicates a portion of the first media content that had been received when the channel change request was detected. The method further includes providing, by the media device to a display device, second media content of a received second data stream corresponding to the second channel. The method also includes, in response to detecting a second channel change request to return to the first channel, providing by the media device to a display device, the first media content of the first data stream beginning from a location of the first media content indicated by the user history data.

In another particular embodiment, a media device includes a processor that is configured to receive a data stream from a server and to extract data from the data stream, where the data corresponds to received media content. The processor is further configured to store the extracted data as stored media content and to determine whether the stored media content corresponds to expected media content. The processor is also configured to send a content request to a server in response to determining that the stored media content does not correspond to the expected media content. The content request identifies a segment of the expected media content that does not correspond to the stored media content. The media device also includes a memory that is coupled to the processor. The stored media content is stored at the memory.

FIG. 1 is a diagram of a particular embodiment of a system 100 to record media content. The system 100 includes a set-top box 110 and a display device 160 that is coupled to the set-top box 110. The set-top box 110 is configured to receive media content via a distribution network 130.

The set-top box 110 may include a network interface 111, an output interface 114, an input interface 117, a digital video recorder (DVR) 116, content update logic 115, stream continuity logic 112, and a memory 113. The set-top box 110 may be configured to receive one or more data streams from a server via the network interface 111. For example, the network interface 111 of the set-top box 110 may be configured to communicate with a server of a satellite television network, a cable television network, an Internet Protocol Television (IPTV) network, or another content distribution network, or a combination thereof. The network interface 111 may be a wired or wireless network interface, such as an Ethernet interface, an Institute of Electrical and Electronics Engineers (IEEE) 802.11 interface, a coaxial interface, another suitable interface, or any combination thereof. In a particular embodiment, the set-top box 110 is communicatively coupled to the distribution network 130 via the network interface 111.

In a particular embodiment, the output interface 114 may be a wired or wireless interface. For example, the output interface 114 may include a high-definition multimedia interface (HDMI), a digital visual interface (DVI), a separate video (s-video) interface, a component video interface, a coaxial interface, a composite video interface, an optical or other audio interface, another output interface, or any combination thereof. In a particular embodiment, the set-top box 110 provides media content to the display device 160 (e.g., a television) via the output interface 114. The media content may correspond to data extracted from a data stream received at the set-top box via the network interface 111.

In a particular embodiment, the input interface 117 may be a wired or wireless interface. The set-top box 110 may be configured to receive commands from one or more input devices (e.g., an illustrative remote control device 170) via the input interface 117. For example, a user may enter a channel number, a channel up command, a channel down command, a previous channel command, or a command to select a particular channel of an electronic program guide into the remote control device 170, resulting in a channel change request. The user may also use the remote control device 170 to initiate or schedule recording of media content at the set-top box 110. For example, the user may cause a particular program or media content on a particular channel to be recorded. The particular channel may correspond to a data stream received at the set-top box 110 via the network interface 111 from a particular network address (e.g., a multicast address of an IPTV system) or within a particular frequency range associated with the particular channel.

In a particular embodiment, the set-top box 110 may receive more than one data stream at a particular time. For example, the set-top box 110 may receive a first data stream while substantially simultaneously receiving a second data stream. The second data stream may include data corresponding to second media content. Both the first media content and the second media content may be recorded, or the media content of one of the data streams may be processed and provided to the display device 160 in real-time (i.e., without long-term recording of the media content by the DVR 116). As used herein, "recording" media content refers to storing data corresponding to the media content in a non-volatile memory of the DVR 116. Thus, recording is distinct from buffering packets of a data stream for quality control, packet sequencing, etc.

In a particular embodiment, the set-top box 110 may store data extracted from a received data stream at the DVR 116. The set-top box 110 may provide the stored data (i.e., the stored media content) from the DVR 116 to the display device 160. For example, the stored media content may correspond to a particular television program that a user scheduled for recording. The set-top box 110 may also store information related to media content that is being recorded or scheduled to be recorded. For example, information related to content formats (e.g., standard definition (SD), high definition (HD), or three-dimensional (3-D)) of media content being recorded or scheduled to be recorded may be stored at the DVR 116. In an alternative embodiment, content format information may be stored at the set-top box 110 in a memory that is separate from the DVR 116, such as the memory 113.

The set-top box 110 may also store other information regarding media content that is being recorded or scheduled to be recorded. For example, the set-top box 110 may store one or more threshold values that are associated with expected quality level of the media content. The threshold values may be used to determine whether the recorded media content is of satisfactory quality. The threshold values may be default values or values specified by a user or values specified by the content provider. Properties of stored (i.e., recorded) media content may be compared to the threshold values to determine whether the stored media content satisfies the threshold values and thus is of satisfactory quality. To illustrate, stored media content may fail to satisfy a particular threshold value when the stored media content has too much jitter (i.e., jitter above a jitter threshold). In another illustrative example, stored media content may fail to satisfy a particular threshold value when an audio level of the stored media content is too low (i.e., is below an audio level threshold). The threshold values may be related to any media quality parameter, such as audio noise level parameters and picture clarity parameters.

The set-top box 110 may also store information used to determine whether the stored media content includes unscheduled content (i.e., media content that was not intended to be recorded). Examples of unscheduled content include breaking news, weather alerts, and a television program that runs beyond an allotted time. The information used to determine whether the stored media content includes unscheduled content may include, for example, hash values related to the expected media content, information regarding a duration of the expected media content, and information regarding an expected recorded size of the expected media content (e.g., in bytes). Information regarding the duration of the expected media content and information regarding the expected recorded size of the expected media content may also be used to determine whether one or more segments are missing from the stored media content. Information regarding the expected recorded size of the expected media content may also be used to determine whether a format of the stored media content matches an expected format, such as an HD content format.

Additionally or in the alternative, the set-top box 110 may store information used to determine whether the stored media content corresponds to the media content scheduled for recording. For example, the set-top box 110 may store the title of media content scheduled for recording. Information regarding the duration of the expected media content and/or information regarding the expected recorded size of the expected media content may also be used to determine whether the stored media content corresponds to the media content scheduled for recording.

In a particular embodiment, the content update logic 115 may determine whether the stored media content corresponds to expected media content. For example, the content update logic 115 may determine whether the stored media content corresponds to the expected media content by determining whether a quality parameter of the stored media content satisfies a quality threshold. To illustrate, the content update logic 115 may determine that the stored media content does not correspond to the expected media content if the stored media content does not satisfy an expected picture quality threshold (e.g., a picture resolution threshold) or an audio quality threshold (e.g., a noise threshold).

In another particular embodiment, the content update logic 115 may determine whether the stored media content corresponds to the expected media content by determining whether one or more segments are missing from the stored media content. For example, the content update logic 115 may compare an expected duration of the stored media content to an actual duration of the stored media content. The content update logic 115 may determine that the stored media content does not correspond to the expected media content if the duration of the stored media content is shorter or longer than the expected duration of the stored media content by a threshold amount. Similarly, the content update logic 115 may compare an expected size of the stored media content to an actual size of the stored media content. The content update logic 115 may determine that the stored media content does not correspond to the expected media content if a size of the stored media content is smaller or larger than the expected size of the stored media content by a threshold amount.

In a particular embodiment, the content update logic 115 may determine whether the stored media content corresponds to the expected media content by determining whether a format of the stored media content matches an expected format. For example, the expected format may be an SD content format, an HD content format, or a 3-D content format. To illustrate, the content update logic 115 may determine that the stored media content does not correspond to the expected media content if the expected format of the stored media content is an HD content format and an actual content format of the stored media content is an SD content format. In an alternative embodiment, the expected format of the stored media content may be a tactile format, an olfactory format, or any other media content format.

In a particular embodiment, the content update logic 115 may determine whether the stored media content corresponds to the expected media content by determining whether a format of the stored media content corresponds to an expected video compression format. For example, the expected video compression format may be H.262, H.263, H.264, or VC-2. To illustrate, the content update logic 115 may determine that the stored media content does not correspond to the expected media content if the expected video compression format of the stored media content is an H.264 format and an actual video compression format of the stored media content is an H.262 format.

In a particular embodiment, the content update logic 115 may determine whether the stored media content corresponds to the expected media content by determining whether an audio format of the stored media content corresponds to an expected audio format. For example, the expected audio format may be WAVEform (WAV), Windows Media Audio (WMA), or Motion Picture Experts Group Audio Layer III (MP3). To illustrate, the content update logic 115 may determine that the stored media content does not correspond to the expected media content if the expected audio format of the stored media content is an MP3 format and an actual audio format of the stored media content is a WMA format.

The content update logic 115 may also determine whether the stored media content corresponds to the expected media content by determining whether the stored media content corresponds to a particular program (i.e., media content) that was selected or scheduled for recording. For example, a user may schedule a particular television program (e.g., a particular movie) for recording at the set-top box 110. The content update logic 115 may determine whether the recorded media content corresponds to the particular television program based on information, such as movie title, embedded in the television program. The content update logic 115 may also determine whether the recorded television program corresponds to a particular movie by comparing the duration of the recorded television program to the actual duration of the stored movie. Similarly, the content update logic 115 may determine whether the recorded television program corresponds to a particular movie by comparing the size of the recorded television program to the actual size of the recorded movie.

In a particular embodiment, the content update logic 115 may determine that the stored media content does not correspond to the expected media content if a threshold portion of the stored media content does not correspond to the expected media content. For example, the content update logic 115 may determine that the stored media content does not correspond to the expected media content if a particular percentage of the stored media content does not correspond to a movie selected or scheduled for recording. Alternatively or in addition, the content update logic 115 may determine that the stored media content does not correspond to the expected media content if a segment of the stored media content between two timestamps of the media content does not correspond to media content selected or scheduled for recording.

In another particular embodiment, the content update logic 115 may determine that the stored media content does not correspond to the expected media content if any portion of the stored media content does not correspond to a movie selected or scheduled for recording. To illustrate, the content update logic 115 may determine that the stored media content does not correspond to the expected media content if the stored media content includes, for example, unscheduled (i.e., not schedule for recording) content, such as a breaking news segment.

In a particular embodiment, in response to determining that the stored media content does not correspond to the expected media content, the content update logic 115 may send a content request to a server. The content request may identify a segment of the expected media content that does not correspond to the stored media content. For example, the identified segment of the expected media content that does not correspond to the stored media content may include the entire expected media content. Alternatively, the identified segment may correspond to less than the entire expected media content. For example, the identified segment may correspond to a portion of the expected media content that is scrambled. As another example, the identified segment may correspond to a portion of the expected media content that is includes unscheduled content, such as breaking news.

In a particular embodiment, the set-top box 110 may be configured to receive second media content that corresponds to the segment of the expected media content that does not correspond to the stored media content. As described above, the stored media content may be extracted from a first data stream and the second media content may be extracted from a second media stream received at the set-top box 110 via the network interface 111. In a particular embodiment, the second data stream is received from a server at a data transfer rate that is higher than a data transfer rate at which the first data stream is received. In a particular alternative embodiment, the second data stream is received from the server at a data transfer rate that is lower than a data transfer rate at which the first data stream is received. The segment of the expected media content that does not correspond to the stored media content may include the entire expected media content or a portion of the expected media content.

The content update logic 115 may be configured to update the stored media content based on the second media content extracted from the second data stream. For example, the content update logic 115 may replace a portion of the stored media content with the received second media content corresponding to the segment of the expected media content that does not correspond to the stored media content. The portion of the stored media content that is replaced may correspond to part or all of the stored media content.

By evaluating the stored media content during or at the end of recording, media content stored at the set-top box 110 may be updated to reduce or eliminate deficiencies in the stored media content before a user accesses the stored media content.

In a particular embodiment, the system 100 of FIG. 1 may also enable a user, upon a return to a particular channel, to continue watching a television program (i.e., media content) beginning from a location of the television program indicated by a user history data 119. The particular channel may correspond to a data stream received at the set-top box 110 via the network interface 111 from a particular network address (e.g., a multicast address of an IPTV system) or within a frequency range associated with the particular channel. For example, a user watching first media content on a first channel may desire to change from the first channel to a second channel for some duration of time and to subsequently return back to the first channel. To illustrate, the user may use the remote control device 170 to input a channel change request, such as a request to switch from the first channel to a second channel. The stream continuity logic 112 of the set-top box 110 may be configured to detect the channel change request. Upon detection of the channel change request, the stream continuity logic 112 may store user history data 119 in the memory 113 of the set-top box 110. For example, the user history data 119 may indicate a portion of the first media content corresponding to the first channel that had been received when the channel change request was detected. To illustrate, timestamp and received media content size may be used to indicate the portion of the first media content.

In a particular embodiment, the memory 113 may also include user preferences data 140. The user preferences data 140 may specify particular channels for which user history data 119 is to be stored. For example, the user preferences data 140 may include channel identifiers, such as channel numbers or internet protocol (IP) addresses. In a particular embodiment, the user preferences data 140 may be automatically determined by the set-top box 110. For example, channel identifiers included in the user preferences data 140 may correspond to frequently selected channels. Alternatively or in addition, the user may also identify preferred channels for inclusion in the user preferences data 140. In another particular embodiment, channel identifiers corresponding to all available channels may be included in the user preferences data 140.

In response to detecting the channel change request to change from the first channel to the second channel, the set-top box 110 may provide to the display device 160 second media content of a received second data stream corresponding to the second channel. For example, the set-top box 110 may receive the second data stream in response to a request sent by the set-top box 110 to the server of the distribution network 130. The set-top box 110 may process the second data stream to extract received media content from the second data stream.

The stream continuity logic 112 of the set-top box 110 may be configured to detect a second channel change request to return to the first channel. In response to detecting the second channel change request to return to the first channel, the set-top box 110 may provide to the display device 160 the first media content of the first data stream (i.e., the data stream corresponding to the first channel). The first media content may resume where it left off in response to the first channel change request. For example, the first media content may be provided beginning from a location of the first media content indicated by the user history data 119. To illustrate, if the portion of the first media content of the first data stream indicated by the user history data 119 corresponds to a first half hour of a particular television program, upon return to the first channel, the set-top box 110 may be configured to provide to the display device 160 the particular television program beginning from the end of the first hour of the program. In a particular embodiment, the end of the first hour of the program may be indicated by a timestamp.

In a particular embodiment, the user might switch to several channels before returning to the first channel. For example, the user may sequentially change from the first channel to a second channel followed by a third channel before returning to the first channel. If a channel identifier corresponding to the first channel is specified in the user preferences data 140, the stream continuity logic 112 may store the user history data 119 for the first channel in the memory 113. If the user returns to the first channel within a threshold time after first changing from the first channel to the second channel, the first media content may be provided to the display device 160 beginning from a location of the first media content indicated by the user history data 119.

In a particular embodiment, in response to detecting the channel change request from the first channel to the second channel, the set-top box 110 may request from a server a second data stream corresponding to the second channel and the first data stream beginning from the location of the first media content indicated by the user history data 119. For example, the set-top box 110 may store in a memory (such as the memory 113 or a memory of the DVR 116) media content extracted from the first data stream beginning from the location of the first media content indicated by the user history data 119. The set-top box 110 may subsequently provide from the memory to the display device 160 the stored first media content beginning from the location of the first media content indicated by the user history data 119. In another embodiment, the set-top box 110 may, in response to detecting the second channel change request to return to the first channel, request from the server the first data stream corresponding to the first channel beginning from the location of the first media content indicated by the user history data 119.

During operation, the set-top box 110 may receive a data stream (e.g., an IPTV data stream) and store media content extracted from the data stream. The set-top box 110 may store the extracted data at a memory, such as at a memory of the DVR 116. The content update logic 115 may determine whether the stored media content corresponds to expected media content. For example, the set-top box 110 may determine whether a quality of the stored media content satisfies quality criteria. In response to determining that the stored media content does not correspond to the expected media content, the content update logic 115 may send a content request to a server identifying a segment of the expected media content that does not correspond to the stored media content. For example, the content request may identify a ten-minute segment of the expected media content that does not correspond to the stored media content. The set-top box 110 may receive from the server a second data stream including second media content. The received media content may include the segment of the expected media content that does not correspond to the stored media content. The content update logic 115 may update the stored media content based on the received second media content. For example, the content update logic 115 may replace a portion of the stored media content with the received media content.

Additionally, while receiving a data stream corresponding to a first channel, the set-top box 110 may detect a channel change request to change from the first channel to a second channel. The stream continuity logic 112 may store user history data 119 for the first channel at the memory 113. The user history data 119 may indicate a portion of the first media content extracted from the first data stream that had been received when the channel change request was detected. In response to the channel change request to change to the second channel, the set-top box 110 may provide to the display device 160 second media content of a received second data stream corresponding to the second channel. For example, the set-top box 110 may extract the second media content from the second data stream and provide the second media content to the display device 160. The extracted media content may be provided to the display device 160. In response to detecting a second channel change request to return to the first channel, the set-top box 110 may provide the first data stream beginning a location of the first media content indicated by the user history data 119.

Thus, the system 100 of FIG. 1 may provide improved user experience by providing a seamless restoration of recorded content before the content is presented to the user. By evaluating the stored media content during or at the end of recording, the system 100 of FIG. 1 may provide to the user with media content that is consistent with expected content. When the user is ready to watch the particular recorded media content, the recorded media content may already be updated to match the user's expectations. Additionally, the system 100 of FIG. 1 may enable a user to resume watching a particular television program upon a return to a particular channel.

Although the set-top box 110 and the display device 160 are shown as two separate devices, in a particular embodiment, the set-top box 110 and the display device 160 may be integrated in a single media device. Additionally, although FIG. 1 illustrates a set-top box, alternative embodiments may include other media devices including devices that have an integrated display device. For examples, other embodiments may include a lap top computer, a mobile phone, other forms of handheld devices, other similar devices, or any combination thereof. Further, in a particular embodiment, operations of the update logic 115 and the stream continuity logic 112 may be at least partially performed by a processor. The DVR 116 may also be included in the set-top box 110 or may be a separate component of the system 100 of FIG. 1.

Figure 2:
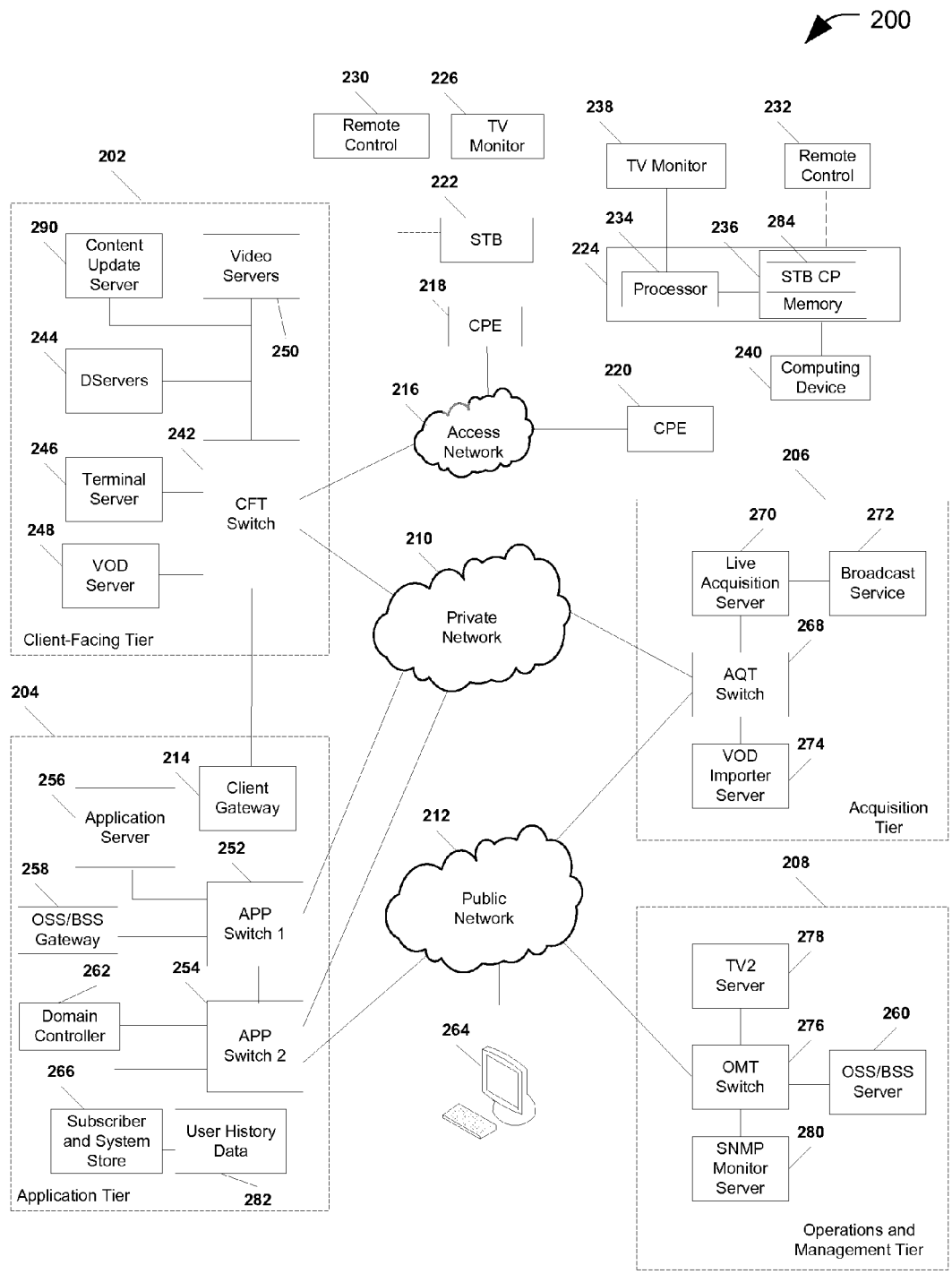
FIG. 2 is a diagram of a particular embodiment of an Internet protocol television (IPTV) system in which the system of FIG. 1 may be integrated.

FIG. 2 illustrates a particular embodiment of an Internet Protocol Television (IPTV) system 200. As shown, the system 200 can include a client facing tier 202, an application tier 204, an acquisition tier 206, and an operations and management tier 208. Each tier 202, 204, 206, 208 is coupled to a private network 210, to a public network 212, such as the Internet, or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 214, can communicate directly with the client-facing tier 202.

The client-facing tier 202 can communicate with user equipment via an access network 216, such as an Internet Protocol Television (IPTV) access network. In an illustrative embodiment, customer premises equipment (CPE) 218, 220 can be coupled to a local switch, router, or other device of the access network 216. The client-facing tier 202 can communicate with a first representative set-top box device 222 at a first customer premise via the first CPE 218 and with a second representative set-top box device 224 at a second customer premise via the second CPE 220. The CPE 218, 220 can include routers, local area network devices, modems, such as digital subscriber line (DSL) modems, residential gateways (e.g., the residential gateway 120 of FIG. 1 or the residential gateway 240 of FIG. 2) any other suitable devices for facilitating communication between a set-top box device and the access network 216, or any combination thereof.

The client-facing tier 202 can be coupled to the CPE 218, 220 via digital subscriber lines, coaxial cables, fiber optic cables, or other connectors. In a particular embodiment, the client-facing tier 202 is coupled to the CPE 218, 220 via fiber optic cables. In another particular embodiment, the CPE 218, 220 are digital subscriber line (DSL) modems that are coupled to one or more network nodes via twisted pairs. The client-facing tier 202 can be coupled to the network nodes via fiber-optic cables or other types of connectors. Each set-top box device 222, 224 can process data received via the access network 216 and via an IPTV software platform.

The first set-top box device 222 can be coupled to a first external display device, such as a first television monitor 226, and the second set-top box device 224 can be coupled to a second external display device, such as a second television monitor 228. Moreover, the first set-top box device 222 can communicate with a first remote control 230, and the second set-top box device 224 can communicate with a second remote control 232. The set-top box devices 222, 224 can include IPTV set-top box devices, video gaming devices or consoles that are adapted to receive IPTV content, personal computers or other computing devices that are adapted to emulate set-top box device functionalities, any other device adapted to receive IPTV content and transmit data to an IPTV system via an access network, or any combination thereof. In a particular embodiment, the set-top box devices 222, 224 may correspond to the set-top box 110 of FIG. 1.

In an exemplary, non-limiting embodiment, each set-top box device 222, 224 can receive data, video, or any combination thereof, from the client-facing tier 202 via the access network 216 and render or display the data, video, or any combination thereof, at the television monitor 226, 228 to which it is coupled. In an illustrative embodiment, the set-top box devices 222, 224 can include tuners that receive and decode television programming signals or packet streams for transmission to the television monitors 226, 228. Further, the set-top box devices 222, 224 can include a STB processor 234 and a STB memory device 236 that is accessible to the STB processor 234. In one embodiment, a computer program, such as the STB computer program 284, can be embedded within the STB memory device 236. For example, the STB computer program 284 may include logic, modules, and/or instructions executable by the processor 234 to implement the content update logic 115 of FIG. 1 and the stream continuity logic 112 of FIG. 1.

In an illustrative embodiment, the client-facing tier 202 can include a client-facing tier (CFT) switch 242 that manages communication between the client-facing tier 202 and the access network 216 and between the client-facing tier 202 and the private network 210. As illustrated in FIG. 2, the CFT switch 242 is coupled to one or more data servers, such as D-servers 244, that store, format, encode, replicate, or otherwise manipulate or prepare video content for communication from the client-facing tier 202 to the set-top box devices 222, 224. The CFT switch 242 can also be coupled to a terminal server 246 that provides terminal devices with a connection point to the private network 210. In a particular embodiment, the CFT switch 242 can be coupled to a video-on-demand (VOD) server 248 that stores or provides VOD content imported by the IPTV system 200. Further, the CFT switch 242 is coupled to one or more video servers 250 that receive video content and transmit the content to the set-top box devices 222, 224 via the access network 216. In a particular embodiment, the client-facing tier 202 also includes a content update server 290. The content update server 290 may provide media content to the first set-top box device 222, to the second set-top box device 224, or both, to update stored media content at one or more of the set-top box devices 222. The content update server 290 may also provide media content of a data stream corresponding to a first channel to the first set-top box device 222 and/or to the second set-top box device 224, where the first set-top box device 222 and/or the second set-top box device 224 provide the media content to the display device beginning from a particular location of the media content.

In an illustrative embodiment, the client-facing tier 202 can communicate with a large number of set-top boxes, such as the representative set-top box devices 222, 224, over a wide geographic area, such as a regional area, a metropolitan area, a viewing area, a designated market area or any other suitable geographic area, market area, or subscriber or customer group that can be supported by networking the client-facing tier 202 to numerous set-top box devices. In a particular embodiment, the CFT switch 242, or any portion thereof, can include a multicast router or switch that feeds one or more video streams from a video server to multiple set-top box devices.

As illustrated in FIG. 2, the application tier 204 can communicate with both the private network 210 and the public network 212. The application tier 204 can include a first application tier (APP) switch 252 and a second APP switch 254. In a particular embodiment, the first APP switch 252 can be coupled to the second APP switch 254. The first APP switch 252 can be coupled to an application server 256 and to an OSS/BSS gateway 258. In a particular embodiment, the application server 256 can provide applications to the set-top box devices 222, 224 via the access network 216, which enable the set-top box devices 222, 224 to provide functions, such as display, messaging, processing of IPTV data and VOD material, etc. In a particular embodiment, the OSS/BSS gateway 258 includes operation systems and support (OSS) data, as well as billing systems and support (BSS) data. In one embodiment, the OSS/BSS gateway 258 can provide or restrict access to an OSS/BSS server 260 that stores operations and billing systems data.

The second APP switch 254 can be coupled to a domain controller 262 that provides Internet access, for example, to users at their computers 264 via the public network 212. For example, the domain controller 262 can provide remote Internet access to IPTV account information, e-mail, personalized Internet services, or other online services via the public network 212. In addition, the second APP switch 254 can be coupled to a subscriber and system store 266 that includes account information, such as account information that is associated with users who access the IPTV system 200 via the private network 210 or the public network 212. In an illustrative embodiment, the subscriber and system store 266 can store subscriber or customer data and create subscriber or customer profiles that are associated with IP addresses of corresponding set-top box devices 222, 224. The user history data 282 may include information, such as timestamp information and media content size information, indicating a portion of the first media content that had been received when a channel change request from a first channel to a second channel is detected at one of the set-top box devices 222, 224. To illustrate, upon a return to the first channel, the set-top box device 222 may provide to the television monitor 226 the first media content beginning from a location of the first media content indicated by the user history data 282. Similarly, the second set-top box device 224 may provide to the television monitor 238 the first media content beginning from the location of the first media content indicated by the user history data 282.

In a particular embodiment, the application tier 204 can include a client gateway 214 that communicates data directly to the client-facing tier 202. In this embodiment, the client gateway 214 can be coupled directly to the CFT switch 242. The client gateway 214 can provide user access to the private network 210 and the tiers coupled thereto. In an illustrative embodiment, the set-top box devices 222, 224 can access the IPTV system 200 via the access network 216, using information received from the client gateway 214. User devices can access the client gateway 214 via the access network 216, and the client gateway 214 can allow such devices to access the private network 210 once the devices are authenticated or verified. Similarly, the client gateway 214 can prevent unauthorized devices, such as hacker computers or stolen set-top box devices, from accessing the private network 210, by denying access to these devices beyond the access network 216.

For example, when the first representative set-top box device 222 accesses the client-facing tier 202 via the access network 216, the client gateway 214 can verify subscriber information by communicating with the subscriber and system store 266 via the private network 210. Further, the client gateway 214 can verify billing information and status by communicating with the OSS/BSS gateway 258 via the private network 210. In one embodiment, the OSS/BSS gateway 258 can transmit a query via the public network 212 to the OSS/BSS server 260. After the client gateway 214 confirms subscriber and/or billing information, the client gateway 214 can allow the set-top box device 222 to access IPTV content and VOD content at the client-facing tier 202. If the client gateway 214 cannot verify subscriber information for the set-top box device 222, e.g., because it is connected to an unauthorized twisted pair, the client gateway 214 can block transmissions to and from the set-top box device 222 beyond the access network 216.

As indicated in FIG. 2, the acquisition tier 206 includes an acquisition tier (AQT) switch 268 that communicates with the private network 210. The AQT switch 268 can also communicate with the operations and management tier 208 via the public network 212. In a particular embodiment, the AQT switch 268 can be coupled to a live acquisition server 270 that receives or acquires television content, movie content, advertisement content, other video content, or any combination thereof, from a broadcast service 272, such as a satellite acquisition system or satellite head-end office. In a particular embodiment, the live acquisition server 270 can transmit content to the AQT switch 268, and the AQT switch 268 can transmit the content to the CFT switch 242 via the private network 210.

In an illustrative embodiment, content can be transmitted to the D-servers 244, where it can be encoded, formatted, stored, replicated, or otherwise manipulated and prepared for communication from the video server(s) 250 to the set-top box devices 222, 224. The CFT switch 242 can receive content from the video server(s) 250 and communicate the content to the CPE 218, 220 via the access network 216. The set-top box devices 222, 224 can receive the content via the CPE 218, 220, and can transmit the content to the television monitors 226, 228. In an illustrative embodiment, video or audio portions of the content can be streamed to the set-top box devices 222, 224.

Further, the AQT switch 268 can be coupled to a video-on-demand importer server 274 that receives and stores media content received at the acquisition tier 206 and communicates the stored content to the VOD server 248 at the client-facing tier 202 via the private network 210. Additionally, at the acquisition tier 206, the video-on-demand (VOD) importer server 274 can receive content from one or more VOD sources outside the IPTV system 200, such as movie studios and programmers of non-live content. The VOD importer server 274 can transmit the VOD content to the AQT switch 268, and the AQT switch 268, in turn, can communicate the material to the CFT switch 242 via the private network 210. The VOD content can be stored at one or more servers, such as the VOD server 248.

When users issue requests for VOD content via the set-top box devices 222, 224, the requests can be transmitted over the access network 216 to the VOD server 248, via the CFT switch 242. Upon receiving such requests, the VOD server 248 can retrieve the requested VOD content and transmit the content to the set-top box devices 222, 224 across the access network 216, via the CFT switch 242. The set-top box devices 222, 224 can transmit the VOD content to the television monitors 226, 228. In an illustrative embodiment, video or audio portions of VOD content can be streamed to the set-top box devices 222, 224.

FIG. 2 further illustrates that the operations and management tier 208 can include an operations and management tier (OMT) switch 276 that conducts communication between the operations and management tier 208 and the public network 212. In the embodiment illustrated by FIG. 2, the OMT switch 276 is coupled to a TV2 server 278. Additionally, the OMT switch 276 can be coupled to an OSS/BSS server 260 and to a simple network management protocol (SNMP) monitor 280 that monitors network devices within or coupled to the IPTV system 200. In a particular embodiment, the OMT switch 276 can communicate with the AQT switch 268 via the public network 212.

In an illustrative embodiment, the live acquisition server 270 can transmit content to the AQT switch 268, and the AQT switch 268, in turn, can transmit the content to the OMT switch 276 via the public network 212. In this embodiment, the OMT switch 276 can transmit the content to the TV2 server 278 for display to users accessing the user interface at the TV2 server 278. For example, a user can access the TV2 server 278 using a personal computer (PC) 264 coupled to the public network 212.

Figure 3:
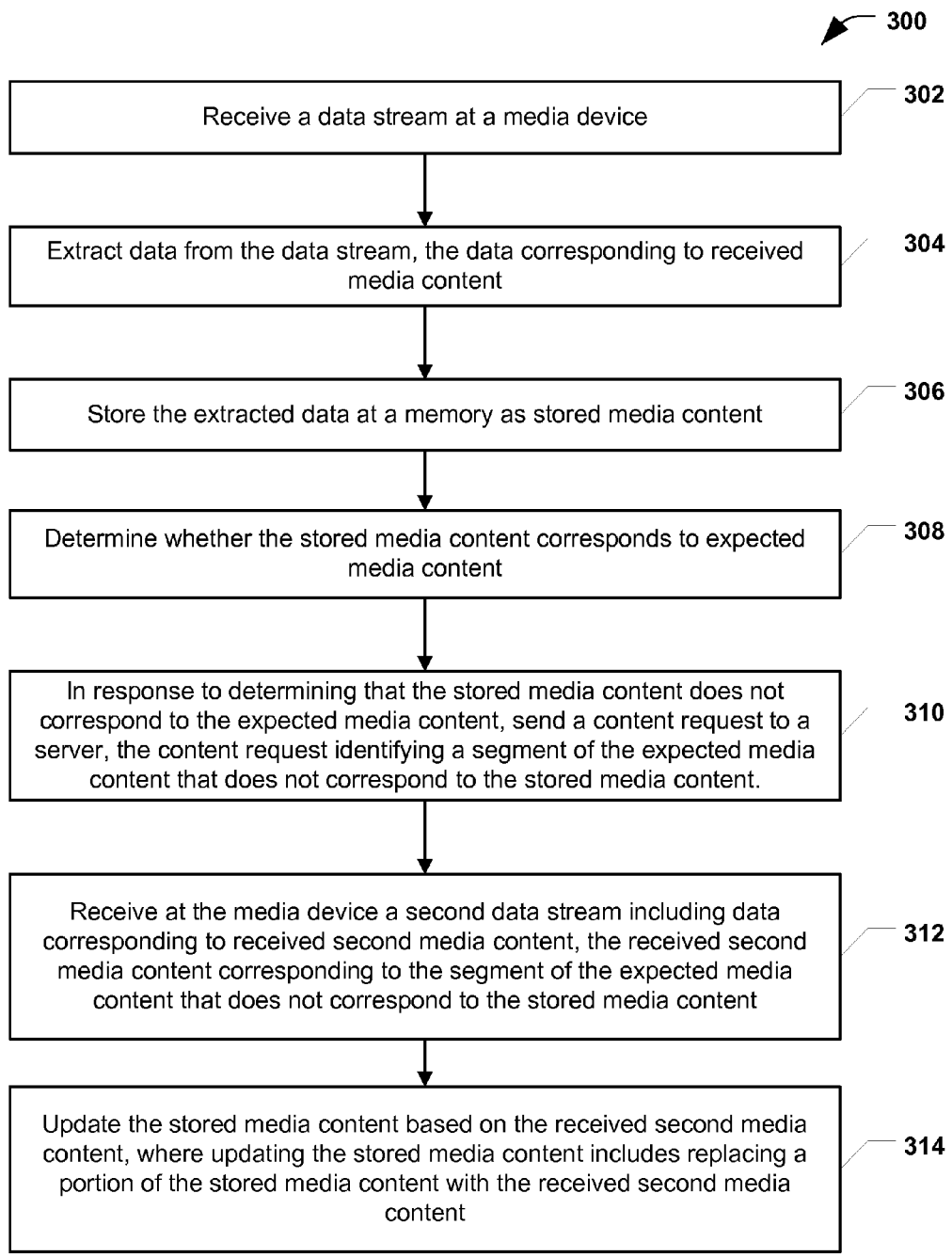
FIG. 3 is a flow chart of a first particular embodiment of a method to record media content.

FIG. 3 is a flow chart of a particular embodiment of a method 300 to record media content. In an illustrative embodiment, the method 300 may be performed by a media device, such as the set-top box 110 of FIG. 1 or one of the set-top box devices 222, 224 of FIG. 2.

The method 300 includes receiving a data stream at a media device, at 302. For example, the set-top box 110 of FIG. 1, the first set-top box device 222 of FIG. 2, or the second set-top box device 224 of FIG. 2, may receive a data stream from a server. At 304, data corresponding to received media content is extracted from the data stream. For example, the set-top box 110 of FIG. 1 may extract from the data stream data corresponding to the media content. At 306, the extracted data is stored at a memory as stored media content. For example, the extracted data may be stored at the DVR 116 of FIG. 1 or the STB memory device 236 of FIG. 2. The stored data corresponding to the received media content may be a payload portion of data packets received as a data stream at the set-top box 110 of FIG. 1, the first set-top box device 222 of FIG. 2, or the second set-top box device 224 of FIG. 2.

The method 300 further includes determining whether the stored media content corresponds to expected media content, at 308. For example, in FIG. 1, the content update logic 115 may determine whether the stored media content corresponds to expected media content. To illustrate, the content update logic 115 may determine whether the stored media content corresponds to expected media content by determining whether one or more segments are missing from the stored media content.

In response to determining that the stored media content does not correspond to the expected media content, a content request may be sent to a server, at 310. The content request may identify a segment of the expected media content that does not correspond to the stored media content. For example, in FIG. 1, the content update logic 115 may send the content request to a server of the distribution network 130.

The method 300 also includes receiving at the media device a second data stream including data corresponding to received second media content, at 312. The received second media content may correspond to the segment of the expected media content that does not correspond to the stored media content.

At 314, the stored media content is updated based on the received second media content. Updating the stored media content may include replacing a portion of the stored media content with the received second media content. For example, in FIG. 1, the content update logic 115 may update the stored media content based on the received second media content.

The method 300 of FIG. 3 enables evaluating stored media content for expected quality, missing content, unscheduled content, and content format and updating of the stored media content to fill one or more missing segments or to replace one of more segments that do not satisfy a particular quality threshold, such as audio level. Thus, the method 300 of FIG. 3 may provide improved user experience by providing a seamless restoration of recorded content before the content is presented to the user. By evaluating the stored media content during or at the end of recording, the method 300 may provide to the user with media content that is consistent with expected content. When the user is ready to watch the particular recorded media content, the recorded media content may already be updated to match the user's expectations. Additionally, the method 300 may enable a user to resume watching a particular television program upon a return to a particular channel.

Figure 4:
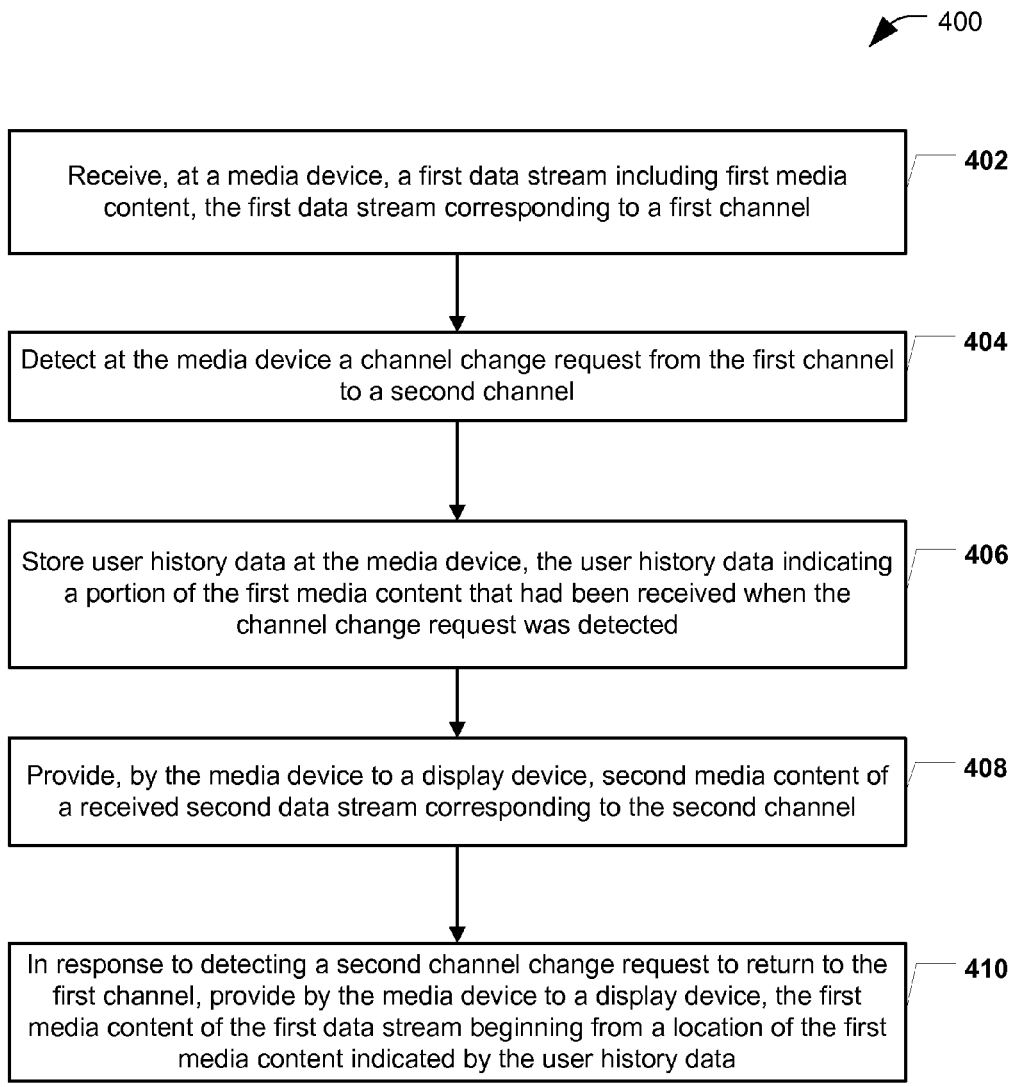
FIG. 4 is a flow chart of a second particular embodiment of a method to record media content.

FIG. 4 is a flow chart of a second particular embodiment of a method of recording media content. In an illustrative embodiment, the method 400 may be performed by a media device, such as the set-top box 110 of FIG. 1 or one of the set-top box devices 222, 224 of FIG. 2.

The method 400 includes receiving, at a media device, a first data stream including first media content, the first data stream corresponding to a first channel, at 402. For example, the first channel may correspond to an internet protocol (IP) address of an IPTV system. In other systems, such as a cable network system, the first channel may correspond to a particular frequency or range of frequencies. A server may send the first data stream corresponding to a particular channel to the set-top box 110 of FIG. 1, the first set-top box device 222 of FIG. 2, the second set-top box device 224 of FIG. 2, or a combination thereof. At 404, a channel change request may be detected at the media device. The channel change request may request that the media device change from receiving a data stream corresponding to the first channel to receiving a data stream corresponding to a second channel. For example, a channel change request detected by the set-top box 110 of FIG. 1, the first set-top box device 222 of FIG. 2, or the second set-top box device 224 of FIG. 2 may correspond to a user input, such as channel number, at a remote control device, such as the remote control device 170.

At 406, user history data is stored at the media device. The user history data indicates a portion of the first data stream that had been received when the channel change request was detected. For example, the stream continuity logic 112 of FIG. 1 may store the user history data 119 at the memory 113. The user history data 119 may include information such as a timestamp corresponding to a channel change request detection time or size of the first media content that had been received when the change channel request was detected at 404.

The method 400 further includes providing, by the media device to a display device, second media content of a received second data stream corresponding to the second channel, at 408. For example, the set-top box 110 of FIG. 1, the first set-top box device 222 of FIG. 2, or the second set-top box device 224 of FIG. 2 may provide the second media content of the received second data stream corresponding to the second channel to a display device, such as the display device 160 of FIG. 1. In response to detecting a second channel change request to return to the first channel, the media device may provide to a display device, such as the display device 160, the first media content of the first data stream beginning from a location of the first media content indicated by the user history data, at 410. To illustrate, the set-top box 110 of FIG. 1, the first set-top box device 222 of FIG. 2, or the second set-top box device 224 of FIG. 2 may request from a server the first data stream corresponding to the first channel and provide to the display device, such as the display device 160, the media content of the first data stream beginning from a location of the first media content indicated by the user history data 119. The set-top box 110 of FIG. 1, the first set-top box device 222 of FIG. 2, or the second set-top box device 224 of FIG. 2 may store the first media content of the first data stream in a memory, such as the memory 113, and provide from the memory to the display device the first media content beginning from the location of the first media content indicated by the user history data.

Figure 5:
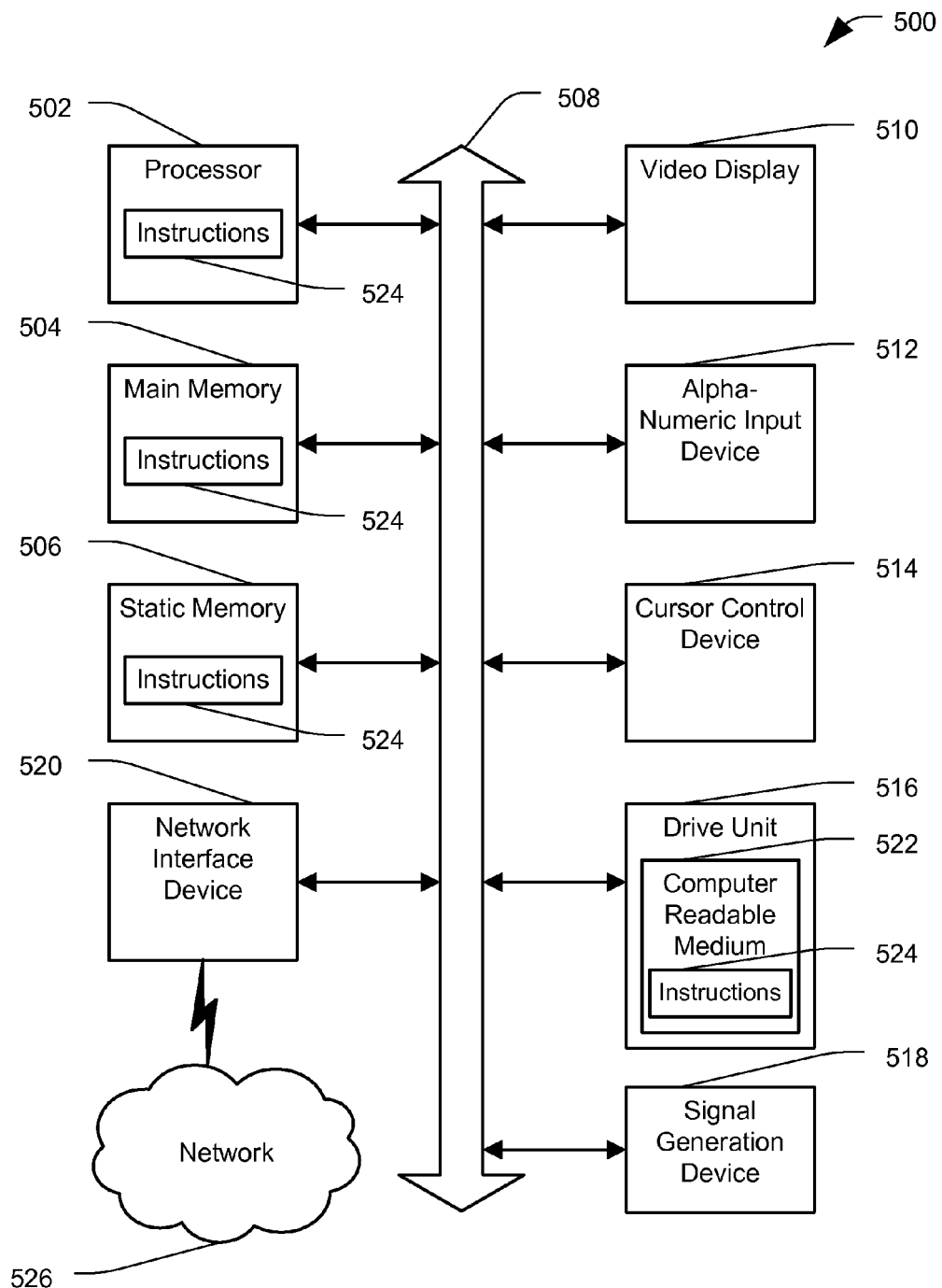
FIG. 5 is a block diagram of an illustrative embodiment of a general computer system.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices. For example, the computer system 500 may include or may be included within the set-top box 110 of FIG. 1, the first or second representative set-top box devices 222, 224 of FIG. 2, or any combination thereof.

The computer system 500 can also be implemented as or incorporated into various other devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 500 can be implemented using electronic devices that provide audio, video, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include or be coupled to the video display unit 510, such as a liquid crystal display (LCD), an organic light emitting diode (OLED), a flat panel display, a cathode ray tube (CRT) display, a solid-state display, or a projection display. For example, the video display unit may be the display device 160 of FIG. 1. Additionally, the computer system 500 may include an input device 512, such as a keyboard, a remote control device (e.g., the remote control device 170 of FIG. 1), and a cursor control device 514 (e.g., a mouse). The computer system 500 can also include a disk drive unit 516, a signal generation device 518, such as remote control device (e.g., the remote control device 170 of FIG. 1), and a network interface device 520.

In a particular embodiment, as depicted in FIG. 5, the disk drive unit 516 may include a tangible (i.e., non-transitory) computer-readable medium 522 in which one or more sets of instructions 524, e.g., software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by the computer system 500. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a tangible computer-readable medium that includes instructions 524 or receives and executes instructions 524, so that a device connected to a network 526 can communicate audio, video or data over the network 526. Further, the instructions 524 may be transmitted or received over the network 526 via the network interface device 520.

The term "computer-readable medium" or "processor-readable medium" may include a single medium or multiple media, such as a centralized or distributed database, and/or associated caches and servers that store one or more sets of instructions. The term "computer-readable medium" or "processor-readable medium" may refer to any non-transitory, tangible medium that is capable of storing or encoding a set of instructions 524 for execution by the processor 502 or that cause the computer system 500 to perform any one or more of the methods or operations disclosed herein.

In a particular non-limiting, exemplary embodiment, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable storage medium and other equivalents and successor media, in which data or instructions may be stored.

Software (e.g., the instructions 524) that is executable to implement the disclosed methods may be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. For example, standards for Internet, other packet switched network transmission (e.g., TCP/IP, UDP/IP, HTML, HTTP, and Internet Group Management Protocol (IGMP)) and standards for encoding or viewing media content (e.g., MPEG, SMPTE, SVC and H.264) represent examples of the state of the art. Such standards may occasionally be superseded by faster or more efficient equivalents having substantially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving a data stream at a media device;
   extracting data from the data stream, the data corresponding to received media content;
   storing the extracted data at a memory as stored media content;
   determining whether the stored media content corresponds to expected media content; and
   in response to determining that the stored media content does not correspond to the expected media content, sending a content request to a server, the content request identifying a segment of the expected media content that does not correspond to the stored media content.

2. The method of claim 1, wherein the data stream is an Internet Protocol Television data steam.

3. The method of claim 1, wherein determining whether the stored media content corresponds to the expected media content includes determining whether a quality of the stored media content satisfies a quality threshold.

4. The method of claim 1, wherein determining whether the stored media content corresponds to the expected media content includes determining whether one or more segments are missing from the stored media content.

5. The method of claim 1, wherein determining whether the stored media content corresponds to the expected media content includes determining whether a format of the stored media content matches an expected format.

6. The method of claim 5, wherein the expected format is a standard definition content format, a high definition content format, or a three-dimensional content format.

7. The method of claim 1, wherein determining whether the stored media content corresponds to the expected media content includes determining whether the stored media content corresponds to media content scheduled for recording.

8. The method of claim 1, further comprising:
receiving at the media device a second data stream including data corresponding to received second media content, the received second media content corresponding to the segment of the expected media content that does not correspond to the stored media content; and
updating the stored media content based on the received second media content.

9. The method of claim 8, wherein updating the stored media content includes replacing a portion of the stored media content with the received second media content.

10. The method of claim 8, wherein the second data stream is received from a server at a higher data transfer rate than a data rate of the data stream.

11. The method of claim 8, wherein the second data stream is received from a server at a lower data transfer rate than a data rate of the data stream based on bandwidth availability.

12. A media device comprising:
a processor configured to:
receive a data stream from a server;
extract data from the data stream, the data corresponding to received media content;
store the extracted data as stored media content;
determine whether the stored media content corresponds to expected media content;
in response to determining that the stored media content does not correspond to the expected media content, sending a content request to a server, the content request identifying a segment of the expected media content that does not correspond to the stored media content; and
a memory coupled to the processor, wherein the extracted data is stored at the memory.

13. The media device of claim 12, wherein determining whether the stored media content corresponds to the expected media content includes determining whether a quality of the stored media content satisfies a quality threshold.

\* \* \* \* \*